United States Patent [19]

Beggs et al.

[11] 4,436,437

[45] Mar. 13, 1984

[54] HIGH ENERGY SINGLE PULSE LASER CALORIMETER

[75] Inventors: William R. Beggs, Albuquerque, N. Mex.; Barry D. Crane, USAF Academy, Colo.

[73] Assignee: The United States of America as represented by the Secretary of the Air Force, Washington, D.C.

[21] Appl. No.: 286,818

[22] Filed: Jul. 27, 1981

[51] Int. Cl.³ .......................... G01J 5/24; G01K 17/00
[52] U.S. Cl. ..................................................... 374/32
[58] Field of Search .................. 374/29, 30, 31, 32, 374/121

[56] References Cited

U.S. PATENT DOCUMENTS 2,921,972  1/1960  Kreisler et al. ...................... 374/32

OTHER PUBLICATIONS

Gunn, "Volume-Absorbing Calorimeters for High-- Power in Laser Pulses", Rev.-Sci. Ins., vol. 45, No. 7, 7/74, pp. 936-943.

Boulanger et al., "An Absolute Calorimeter for High Power $CO_2$ Laser" in Journal of Physics E: Sci. Inst., 1973, vol. 6, pp. 559, 560.

Primary Examiner—Herbert Goldstein
Attorney, Agent, or Firm—Donald J. Singer; Stanton E. Collier

[57] ABSTRACT

A single pulse laser calorimeter apparatus utilizing the high laser output pulse to measure the energy output of the laser. The output energy of the laser is absorbed in a NG-1 type glass panel and is transformed into heat. The heat is transferred to an aluminum back plate which is epoxied to the glass and is detected by a series of forward biased p-n junction diodes that are epoxied to the aluminum plate. The voltage drop across the diodes is monitored with a high impedance measuring device such as a strip chart recorder or A/D converter.

3 Claims, 6 Drawing Figures

HIGH ENERGY SINGLE PULSE LASER CALORIMETER

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to calorimeters, and in particular to a high energy single pulse laser calorimeter apparatus.

Calorimeters for indicating the energy in laser beams must be designed with certain specific characteristics. For example, because of the extremely high concentrated energy in a laser beam, the absorbing material of the calorimeter as well as the volume of the absorbing medium must be such that it will not be damaged by the impingement of the laser beam thereon. It is also important that the medium does not reflect the signal back into the laser which could result in feedback that might damage or destroy the laser itself. In addition, it is important that a relatively high sensitivity be realizable in view of the extremely short period of time of actual impingement of the radiation on the absorbing medium. Normally, a volumetric type of the absorbing medium with a small capacity has greater sensitivity. Finally, it is highly desirable that the calorimeter absorbing medium come to thermal equilibrium as soon as possible after irradiation. If the response time is too slow, the necessity of compensating for energy losses during the lag period must be compensated therefor.

Heretofore, some of the more damage resistant calorimeters have utilized a liquid cell as an absorbing medium. This cell is positioned to intercept the laser radiation and the rise in heat of the liquid in the cell is measured by thermocouples which are connected to the cell and to a reference mass. In order to avoid damage of the cell, it is necessary that it be relatively large and contain a relatively large volume of liquid. This relatively large volume of liquid results in an undesirably long length of time for the liquid to come to thermal equilibrium. By the time equilibrium is obtained so that a proper reading can be taken, some temperature loss has occurred and extrapolation from curves is necessary to correct for the error. Moreover, the sensitivity is somewhat lower than desirable because of the relatively large thermal capacity of the absorbing cell.

SUMMARY OF THE INVENTION

The present invention utilizes the output signal of a large single pulse laser to measure the energy output provided thereby. The laser calorimeter uses a volumetric absorbing neutral density glass plate to capture the laser beam. The output energy in the laser beam is transformed into heat in the glass plate. The heat is absorbed by an aluminum plate which is epoxied to the back of the glass plate with a heat conducting epoxy. Transistors are epoxied to the aluminum plate. The base and emitter leads are then soldered together between adjacent transistors forming a series circuit of diode junctions. A constant current supply, running at approximately 5 milliamps, is connected to the series string of diodes. The voltage drop across the diode string is then monitored with a high impedance measuring device. The voltage drops across the transistors change when energy is absorbed by the glass and conducted to the transistors. The change in voltage drop is a measure of the energy absorbed by the glass.

It is one object of the present invention, therefore, to provide an improved single pulse laser calorimeter.

It is another object of the invention to provide an improved single pulse laser calorimeter transforming linearly the energy output of a laser into a voltage signal.

It is yet another object of the invention to provide an improved single pulse laser calorimeter having a high signal to noise ratio.

It is still another object of the invention to provide an improved single pulse laser calorimeter utilizing the forward bias diode functions as linear sensors to simplify calibration of the calorimeter apparatus.

It is still a further object of the invention to provide an improved single pulse laser calorimeter wherein the obtained voltage signal is a linear function of the heat energy in the laser output beam.

It is an even further object of the invention to provide an improved single pulse laser calorimeter which is economical to produce and utilizes conventional, currently available components that lend themselves to standard mass production manufacturing techniques.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
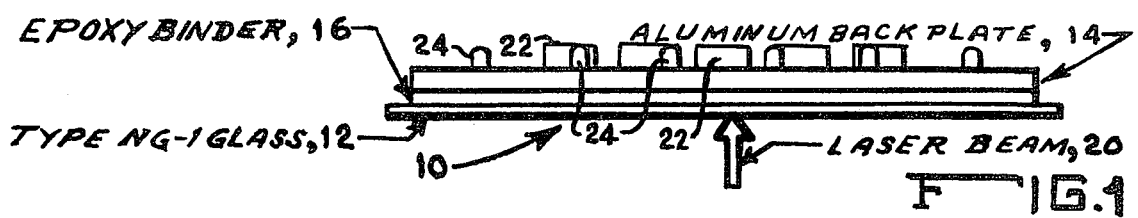
FIG. 1 is a left side view of the high energy single pulse laser calorimeter.

Referring now to FIG. 1, there is shown a left side view of the high energy single pulse laser calorimeter apparatus. The single pulse laser calorimeter apparatus 10 comprises a neutral density glass plate 12, an aluminum back plate 14, an epoxy binder 16 to bond the glass plate and the aluminum plate together, an array of transistors 24 which function as a heat sensor, and a resistor network 22 to calibrate the calorimeter.

The calorimeter apparatus 10 uses a volumetric absorbing neutral density glass plate 12 to capture a laser beam 20. A volumetric absorbing neutral density glass plate is defined as a glass plate which converts the energy of a laser beam into heat. The energy in the laser beam 20 is converted into heat in the glass plate 12. The amount of heat in the glass plate 12 comprises a heat single which is defined as the change in thermal energy in the glass plate 12. The heat is then transferred to an aluminum plate 14 which is epoxied to the back of the glass plate 12 with a heat conducting epoxy 16. The transistors 24 are epoxied to the aluminum plate 14. The base and emitter leads, between respective adjacent transistors 24 are connected together in series to form a series circuit of diode junctions. A constant current supply with an output current of approximately 5 milliamps, is connected to the series string of diodes. When the energy absorbed by the glass plate 12 is conducted to the transistors 24, the voltage drop across the transistors changes. The change in voltage drop is then a measure of the energy absorbed by the glass. The voltage drop across the diode string may be monitored with a high impedance measuring device such as a strip chart recorder or an A-D converter.

The glass plate 12 which was utilized as the laser energy absorbing medium was type Schott NG-1 glass of 3 mm thickness. This glass will absorb laser radiation in all wavelengths of interest for HF or DF lasers (2.5$\mu$ meters to 5$\mu$ meters). An aluminum back plate 14 which was utilized as the energy equilibrating medium was a thin sheet of aluminum (0.794 mm thick). It is noted that thinner sheets cause a noticeable increase in the time constant of the signal output and thicker sheets cause the signal output to decrease because of the added mass of the completed unit. An aluminum plate was selected because of its availability, heat conducting properties, and low cost.

Figure 6:
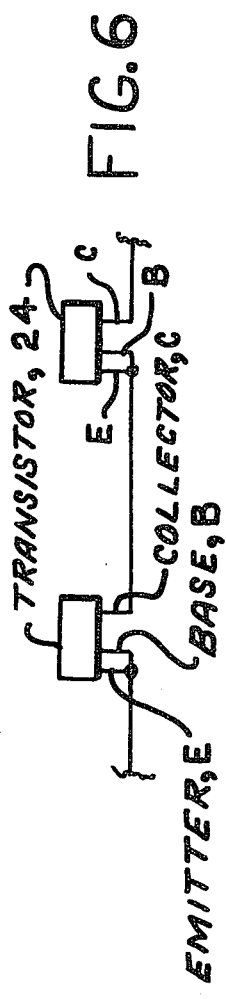

An array of transistors 24 in which the base and emitter leads between adjacent transistors are respectively connected together forms a series circuit of diode junctions that comprise the energy detector (or heat sensor). This transistor configuration which forms a series circuit of diode junction is shown in FIG. 6.

The string of diodes is connected to a current source so that the P-N junctions are forward biased. The bias current required is approximately 5 ma. When forward biased, a P-N junction exhibits a voltage drop across the junction that is directly related to the temperature of the junction. The relationship is given as follows:

$$\Delta T = T_1 - T_2 = \phi V_{P-N}/I_C$$

if $I_C$ is constant and $\phi$ is constant
then: $T_1 = T_2 \approx V_{P-N}$

Therefore, by using a current regulated source to drive the P-N junctions, and monitoring the total voltage drop across the string of P-N junctions, a signal which varies directly with temperature may be measured. A chart recorder was used as the monitoring device. The recorder not only gives a permanent record of the voltage peak, but it also gives indirectly the heat loss of the calorimeter after the laser pulse has been absorbed. The heat loss is determined by noting the slope of the signal decay.

The laws of solid state physics of P-N junctions and the conservation of energy govern the operation of this type calorimeter. The conversion of laser energy to the electrical output signal, begins when the laser pulse impinges on the NG-1 glass plate. At this point the majority of the energy is transmitted into the glass plate. At wavelengths between 2.5 and 5$\mu$ meters, the reflection coefficient was measured to be between 3.5% and 5.6%, varying as a function of wavelength. The transmittance through a NG-1 glass plate of 3 mm thickness was measured to be between 0.6% and 2.5%, again varying with frequency. Any laser energy that is transmitted through the NG-1 glass plate is either absorbed by the aluminum epoxy or reflected back into the glass. If the energy is reflected back into the glass plate only a maximum of 2.5% of the reflected beam would be transmitted back out of the NG-1 glass plate. Since this is only 0.06% of the beam, it is well below the measurement accuracy of the calorimeter and may be neglected.

After the laser energy is absorbed by the NG-1 glass plate, the energy is in the form of heat and is conducted to the aluminum back plate through the 80% aluminum epoxy. This conversion of laser energy to heat may be shown and confirmed by the basic relationship between energy and heat (temperature change in matter):

$$\Delta E \approx K \Delta T$$

The aluminum plate is then equilibrated to a temperature that is directly proportional to the energy absorbed by the glass plate, less any radiation to the environment.

Figure 2:
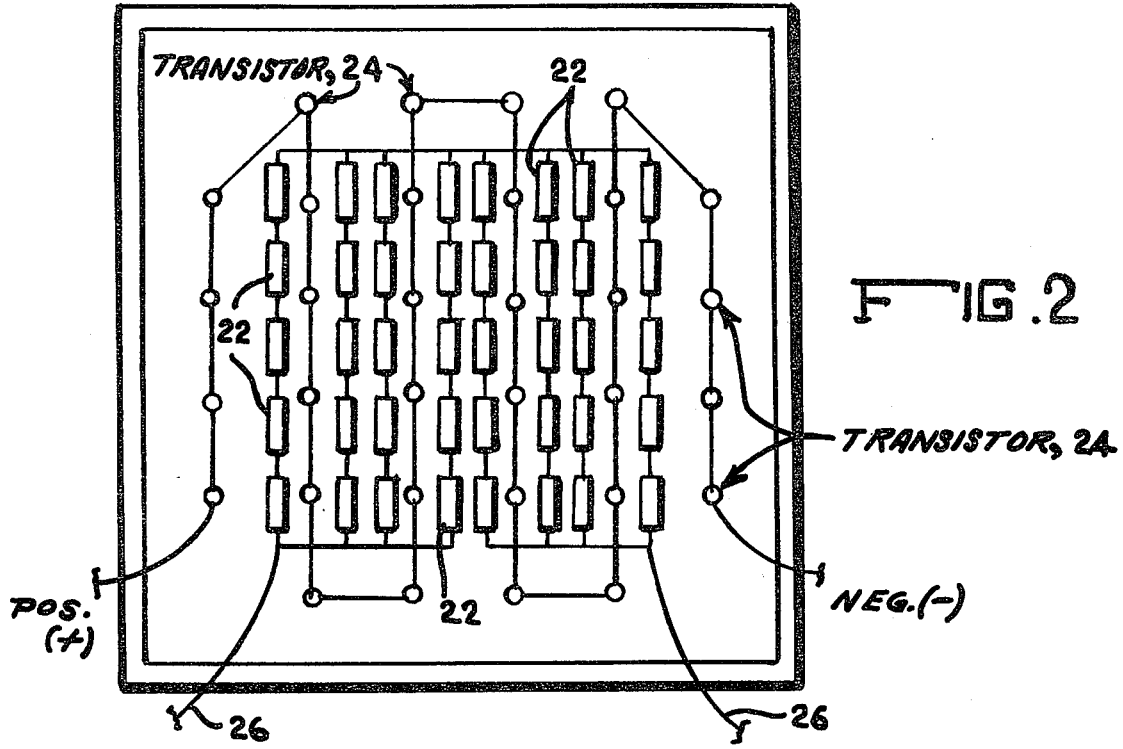
FIG. 2 is a top view pictorial diagram of the high energy single pulse laser calorimeter according to the present invention.

The heat sensor P-N junctions are attached to the aluminum plate with 80% aluminum DEVCON type F epoxy. This epoxy creates a thermal bond between the junctions and the aluminum. The layout of the P-N junctions is shown in FIG. 2. This completes the actual calorimeter with one exception, that being a calibration circuit. To calibrate the unit, energy must be introduced into the calorimeter in a known amount and it must be introduced in a time frame that is relatively small compared to the response time of the whole unit. One easy method of introducing a known amount of energy into the unit is to attach a resistive network 22 to the unit and apply a known voltage to the resistive network for a known time. A pair of lead wires 26 are utilized to connect the resistor network 22 to a known voltage source. Then the energy introduced is calculated as follows:

$$J(\text{joules}) = V^2/R$$

The resistive network 22 was attached to the aluminum plate of the calorimeter with DEVCON type F epoxy. A rear sketch of the calorimeter, showing the layout of the resistor network 22, is shown in FIG. 2.

Figure 3:
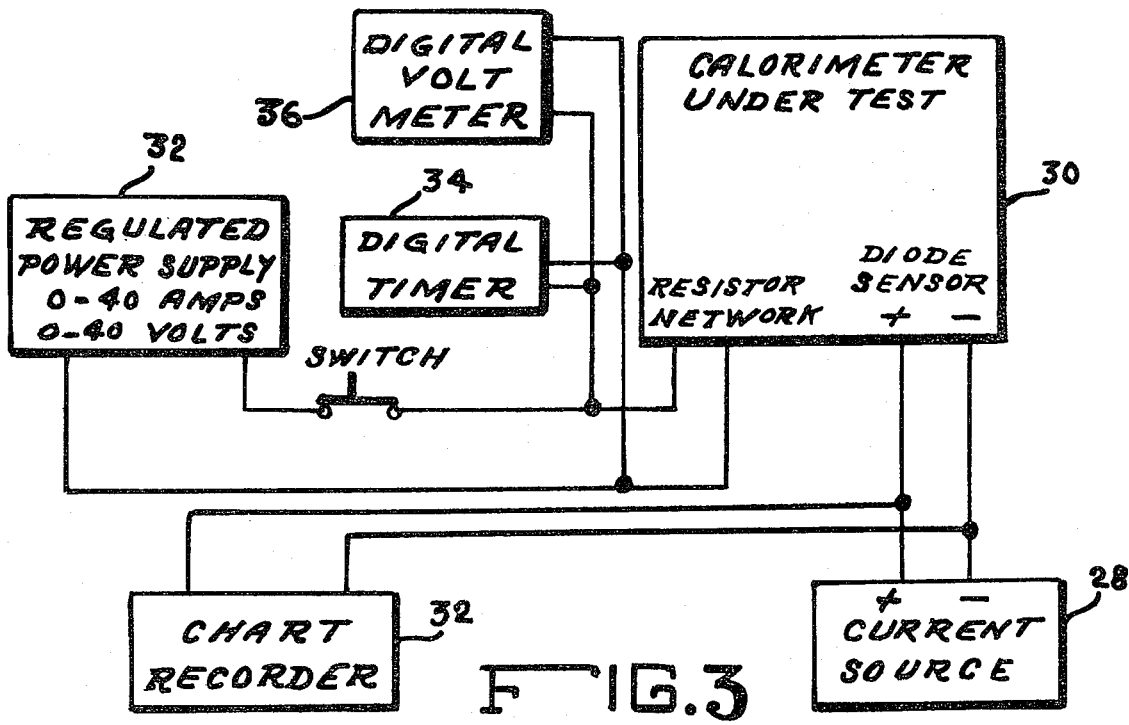
FIG. 3 is a block diagram of the test and calibration arrangement for the high energy single pulse laser calorimeter.

The calibration test of a large calorimeter is discussed in this section. The calibration test set up is as shown in FIG. 3. The procedure is as follows:

1. The calorimeter unit 30 is placed in a water bath at a known temperature and a known stable current from current source 28 is applied to the diode sensor string. The unit is allowed to equilibrate. The output voltage is then noted on the chart recorder 32.

2. The water temperature is then increased approximately 10° C. and the unit is allowed to equilibrate (reach equilibrium). The output voltage change is again noted.

3. The response of the unit is then known. In this case:

$$\frac{V}{T} = \frac{(94.7 - 3.5) \, 5 \, \text{mv}}{(32.4 - 21.6)° \, \text{C.}} = .0422 \text{ volts } °\text{C.}^{-1}$$

Figure 4:
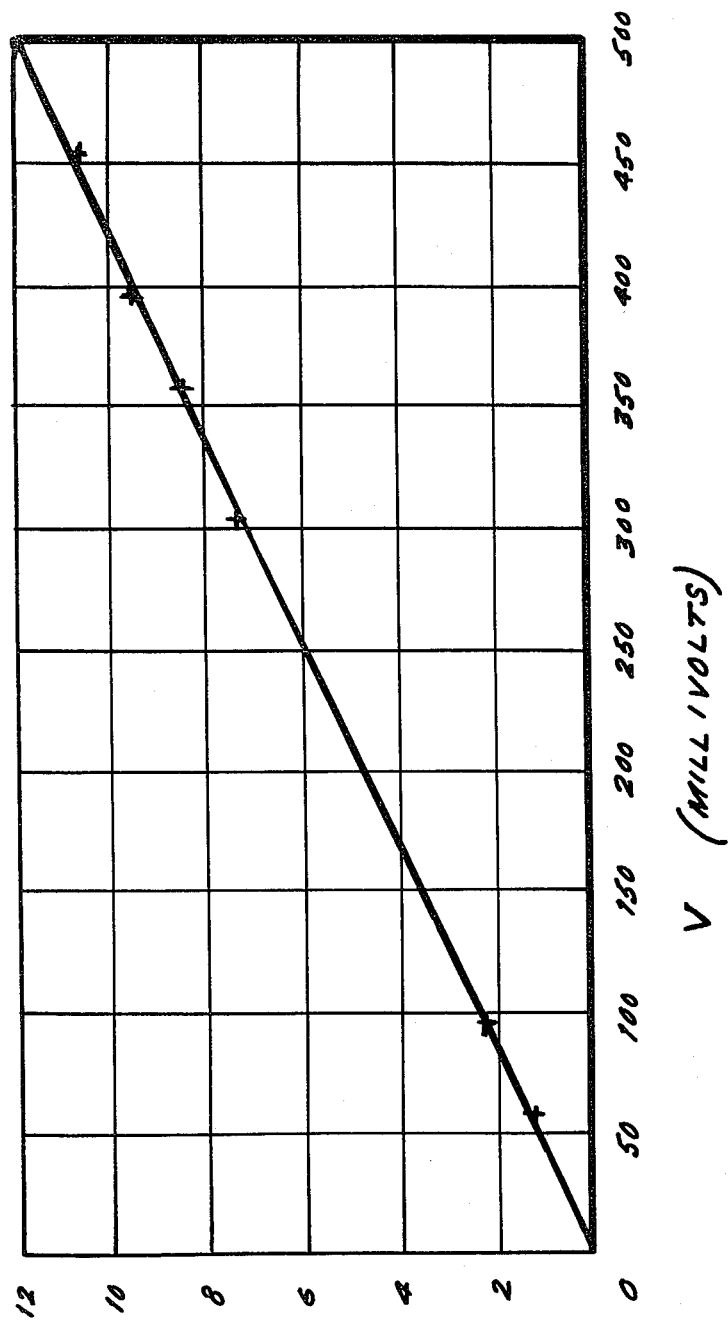
FIG. 4 is a graphical representation of the temperature response versus the voltage output for the single pulse laser calorimeter.

4. Other temperatures were checked and the results plotted. The results show that the output is indeed linear with temperature since all points fall on a straight line. These results are shown in FIG. 4.

5. Next the calorimeter unit 30 was placed in an insulated box, duplicating the same configuration that it would be in during normal operation. A voltage from power supply 32 was applied to the calibration resistor network on the calorimeter unit 30 for a measured period of time, normally 1 to 12 seconds. A digital timer 34 was utilized to measure the exact time period. A digital voltmeter 30 was used to measure the exact value of the applied voltage. In this case the resistor network was measured and found to be 7.947Ω.

Figure 5:
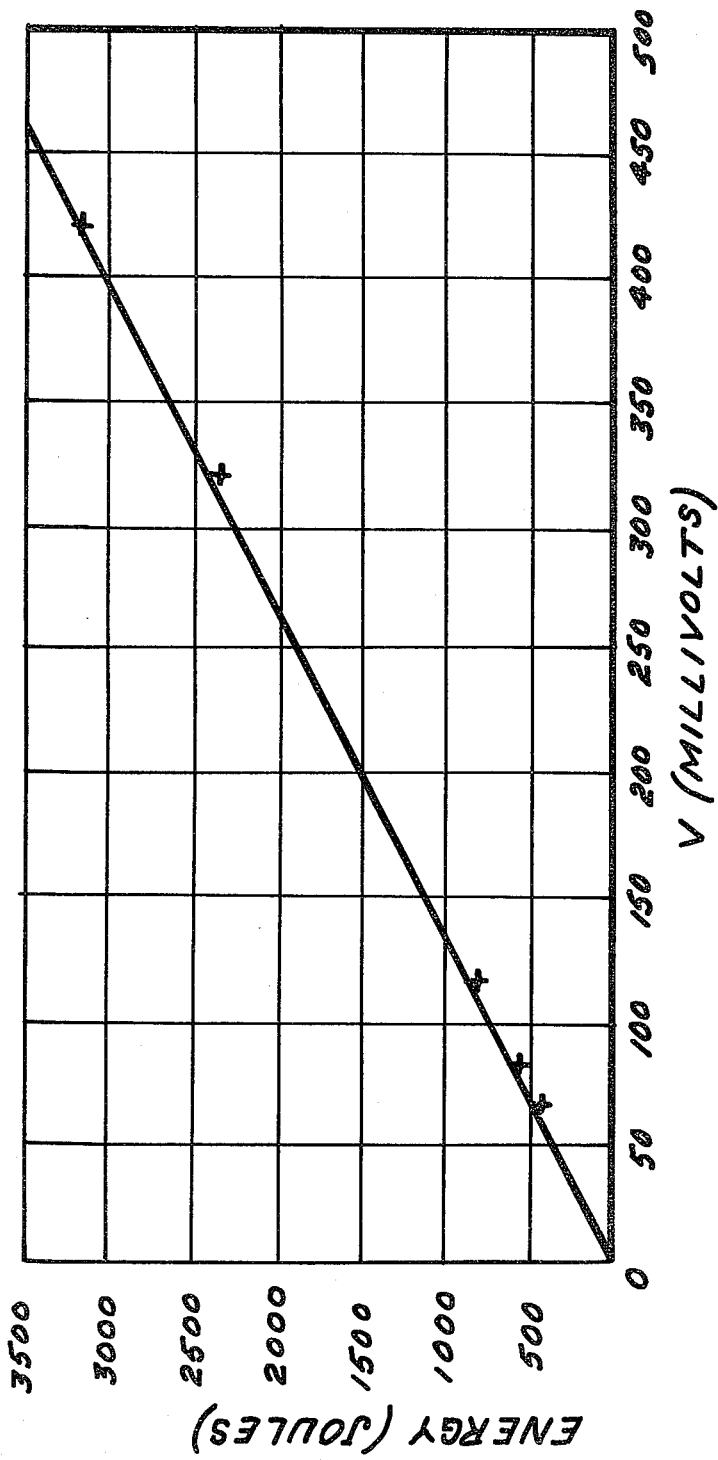
FIG. 5 is a graphical representation of the energy response versus the voltage output for the single pulse laser calorimeter; and, FIG. 6 is a schematic diagram of the transistor configuration which provides a series of diode junctions.

6. The maximum output voltage change for each test was monitored on the chart recorder. These results are plotted in FIG. 5. It may be noted that the points all fall near the straight line on the chart determined by a least squares fit.

7. The results of the tests are then used to derive a calibration factor for the calorimeter in the dimensions of joules per millivolt.

8. Working backwards through the problem the $C_v$ of the device was determined.

mass of unit = 361 grams
response of unit = 42.2 mv/°C.
response of unit = 7.41 joules/mv
conversion factor = 0.2392 calories/joules
$C_v$ = mv/°C. × joules/mv × calories/joule × 1/grams
$C_v$ = 42.2 × 7.41 × 0.2392 × 1/361
$C_v$ = 0.207 calories gram$^{-1}$ °C.$^{-1}$ This result is very close to the estimated $C_v$=0.205 which was based on the evaluation of the mass and the $C_v$ of each individual component in the calorimeter (glass, aluminum, copper, and epoxy).

ACCURACY

| MEASUREMENT | ACCURACY OF MEASUREMENT |
|---|---|
| resistance | ± 1 count in the milliohm range |
| voltage applied | ± .1 volt for voltages above 21 volts |
| time measurements | ± 1 millisecond |
| temperature | ± .05° C. |
| mass | ± .1 gram |
| output voltage response | ± .1 full division on chart paper (1 division = 5 mv) |

CALIBRATION FACTOR ACCURACY

From tests: Response is 7.4555 joules/mv
Calculation of worst case is:

$$\frac{J}{mv} = \frac{v^2 t}{R \, mv} = \frac{(39.8 + 1)^2 (12.007 + .001)}{(7.947 - .001)(321.0 - .5)} = 7.505$$

the range of uncertainty is: 7.505−7.455 = ±0.05 J/mv
Measurement response is then:
7.455±0.05 joules per millivolt All that remains is the addition of the correction factor to compensate for the reflectivity of the NG-1 glass plate. The reflectivity at 2.5 μm was measured to be 4%. Therefore, the correction factor at this wavelength is given by 1/(1-R), where R=0.04. The correction factor is then equal to: 1.042. This factor is then multiplied by the response constant 7.455 j/mv. The 2.5 μm response is then equal to: 7.45 J/mv × 1.042 = 7.76 J/mv.

The above procedure may be used to design and fabricate calorimeters of any practical size. The only modifications to the calculations is the correction factor used to compensate for the reflectivity of the NG-1 glass. This calorimeter should work over a much larger wavelength range than the range mentioned here. The only factor not previously mentioned that may alter the calibration is the transmittance at other frequencies. If other frequencies are of interest the reflectivity should be measured with the aluminum back plate attached to see if the reflectivity changes. If the reflectivity does not change, then, the percentage of the laser energy being transmitted through the glass directly heats the epoxy bonding the glass and aluminum together.

Although the invention has been described with reference to a particular embodiment, it will be understood to those skilled in the art that the invention is capable of a variety of alternative embodiments within the spirit and scope of the appended claims.

What is claimed is:

1. A high energy, single pulse laser calorimeter apparatus comprising in combination:
   an energy absorbing means for absorbing the energy in a laser beam, said energy absorbing means converting the energy in said laser beam to a heat signal,
   an energy equilibrating means to receive and absorb said heat signal,
   a bonding means to bond said energy absorbing means and said energy equilibrating means together, said bonding means being thermally conductive, and,
   a heat sensing means to receive said heat signal from said energy equilibrating means, said heat sensing means detecting and converting said heat signal to a voltage signal, said heat sensing means comprising a plurality of transistors of which the base and emitter leads between respective adjacent transistors are connected together to form a series circuit of diode junctions, and a constant current source to forward bias said series circuit of diode junctions to provide a voltage drop thereacross.

2. A high energy, single pulse laser calorimeter apparatus as described in claim 1 wherein said predetermined thickness equals 0.794 millimeters.

3. A high energy single pulse laser calorimeter apparatus as described in claim 1 wherein said energy absorbing means comprises a volumetric absorbing neutral density glass plate.

* * * * *